United States Patent [19]

Itakura et al.

[11] Patent Number: 4,910,598
[45] Date of Patent: Mar. 20, 1990

[54] SOLID STATE TELEVISION CAMERA WITH CIRCUIT FOR CANCELLING NOISE DUE TO CRYSTAL DEFECTS

[75] Inventors: Hiroyuki Itakura; Takashi Asaida, both of Kanagawa, Japan

[73] Assignee: Sony Corporation, Tokyo, Japan

[21] Appl. No.: 255,329

[22] Filed: Oct. 11, 1988

[30] Foreign Application Priority Data

Oct. 17, 1987 [JP] Japan .............................. 62-261972

[51] Int. Cl.$^4$ .............................................. H04N 3/14
[52] U.S. Cl. .......................... 358/213.17; 358/213.16
[58] Field of Search ...................... 358/213.15–213.18, 358/213.28, 44, 48, 294; 250/578

[56] References Cited

U.S. PATENT DOCUMENTS

| | | | |
|---|---|---|---|
| 4,005,285 | 1/1977 | Price ................................... | 250/578 |
| 4,167,754 | 9/1979 | Nagumo et al. ............... | 358/213.17 |
| 4,523,231 | 6/1985 | Therrien ......................... | 358/213.17 |
| 4,654,714 | 3/1987 | Hurst, Jr. et al. ............... | 358/213.17 |
| 4,739,495 | 4/1988 | Levine ............................. | 358/213.17 |
| 4,802,012 | 1/1989 | Nobue et al. ................... | 358/213.15 |

Primary Examiner—Jin F. Ng
Assistant Examiner—Stephen Brinich
Attorney, Agent, or Firm—Alvin Sinderbrand

[57] ABSTRACT

In a solid state television camera for producing output signals corresponding to an object image detected by a solid state image sensor, positions of picture elements having crystal defects and the output signal levels of such defective components are previously stored as the defective picture element data in a memory device. Defect compensating signals corresponding to the actual image pickup operating states are formed on the basis of the defect picture element data read out from the memory device to correct the output signals of such defective picture elements in a manner to provide the image pickup output signals with superior picture quality.

9 Claims, 8 Drawing Sheets

SOLID STATE TELEVISION CAMERA WITH CIRCUIT FOR CANCELLING NOISE DUE TO CRYSTAL DEFECTS

BACKGROUND OF THE INVENTION

This invention relates to a solid state image pickup apparatus or solid-state television camera having the function of compensating for image defects. Signal processing is used for compensating for a deterioration in picture quality due to an image pickup output from a defective picture element in a solid state image pickup device, such as a charge coupled device (CCD).

Generally, in a solid state image pickup apparatus provided with an image pickup unit composed of solid state image pickup devices, the image pickup output is obtained at the solid state image pickup devices using a field readout mode or a frame readout mode. In the field readout mode signal charges are read out from the totality of the picture elements or pixels during one field period, whereas in the frame readout mode the signal charges are read out from the totality of the pixels during one frame period. Additionally, an electronic shutter function is performed by controlling the effective charge accumulation time of the solid state image pickup device. The image pickup unit of a solid state color image pickup apparatus adapted for color image pickup performs image pickup with three solid state image pickup devices. Color video signals are formed from the image pickup outputs of scene images formed by image pickup light color-separated into the three prime colors of red (R), green (G) and blue (B). For increasing the resolution in the horizontal direction, a space pixel shifting system is used in the solid-state color image pickup apparatus for imaging a scene or an object for each of the color components of the imaging light. Accordingly, a solid-state image pickup device, for example, the solid-state image pickup device adapted to image the scene of a green (G) color component, is arranged at a position shifted by one half pixel pitch in the horizontal direction with respect to the other solid-state image pickup devices, for example those adapted to image the scenes of the red (R) and blue (B) color components.

It is noted that, in the solid-state image pickup device formed by semiconductors, such as CCDs, defective pixel representations are inevitably produced in which, due to the local crystal defects of the semiconductors, a constant bias voltage is added to the image pickup output in proportion to the incident light volume. As a result, the picture quality is deteriorated. The image defect consisting of a constant bias voltage always being added to the image pickup output is called the white flaw defect, since the image defect signal, if processed directly, will appear as bright spots on the monitor screen surface.

To compensate for the deterioration in the picture quality due to the defective pixel representation by the solid-state image pickup device, the conventional practice is to store the information indicating the presence or absence of the pixel defect in memory and to use the imaging output from the pixel adjacent to the defective pixel for interpolating an imaging output to be used in place of the imaging output from the defective pixel.

When there is a defect in the solid-state image pickup device for each pixel in the memory, it becomes necessary to make use of a memory having a voluminous capacity corresponding to the total number of the pixels of the image pickup device. In such case, it has been proposed in our senior patent application, now matured to the Japanese Patent Publication KOKOKU No. 34872/1985, to encode and store the distance between the defective pixels in memory to indicate the position of the defective pixel contained in the solid-state image pickup device, thereby reducing the overall memory capacity.

Although the memory capacity can be reduced by encoding and storing the distance between the defective pixels, the memory is in perpetual operation, resulting in an increase in wasteful power consumption and an increase in the power consumption of the image pickup apparatus as a whole.

On the other hand, the above described compensation by interpolation leads to increased compensation error there is no correlation to the image pickup output for the pixel lying close to the defective pixel. In such case it has been proposed (1) to store the data concerning the position of the defective pixel and the output signal level of the defective component in the memory and (2) to form defect compensation signals at the timing of the output signal of the defective pixel contained in the output signal from the solid state device. Such defect compensation signals are added to the output signal of the device for realizing the compensation defects, (see the Japanese Patent Application KOKAI No. 51378/1985).

It is noted that, in the conventional solid state imaging or image pickup apparatus, defect compensation is made only for image defects caused by the frequent white flaw image defects.

It is noted that, in the solid state imaging device formed by semiconductors, the signal level due to the spurious signal charges and ascribable to the dark current is high. As a result, the image defect caused by the white flaw image defect presents itself rather acutely. However observation of image defects when suppressing the dark current to a lower value has revealed that, besides the white flaw image defect so far known to have a temperature dependency, black flaw image defects which are free from temperature dependency but in which predetermined bias charges are substracted from the image pickup output in proportion to the incident light also are present. In addition, white and black flaw image defects free from temperature dependency but having an incident light volume dependency appear as image defects in the imaging output.

The image defect caused by the white flaw appears rather acutely, but at an extremely low level at an ambient temperature, so that it may be safely disregarded. However, the image defect increases exponentially with increases in temperature. To compensate for the white flaw defects having the temperature dependency, the compensation signal needs to be compensated further for temperature effects. However, should there be any compensation error in the temperature compensating circuit, the white flaw defect may remain overcompensated or under compensated such that so-called compensation flaws are left over in the compensated image pickup output.

In the solid state imaging apparatus performing an electronic shutter function, the charge accumulation time of the solid state imaging device of the image pickup unit is variably controlled by the present speed of the electronic shutter causing a change in the defect level due to defective pixels. The defect level also is changed by switching the readout modes of the signal charges. In case of switching the readout modes for the signal charges, if the charge accumulation time is set to ½ in, for example, the field readout mode, the produced signal charges are equal to one half those for the normal mode. However, for the frame read-out mode, if the charge accumulation time is set to ½ the effective charge accumulation time is one fourth that for the normal accumulation time. Even when the shutter speed is set to the same value, the effective charge accumulation time will differ depending on the readout mode for the signal charges, so that the signal level of the white flaw defect signal included in the image pickup output will also differ. As a result, when the charge accumulation time for the solid state imaging device is changed, an error is caused in the white flaw defect compensation process and a so-called compensation flaw is left over in the image pickup output already compensated for defects.

When the data concerning the positions of the defective pixels included in the solid-state image pickup device are stored in the memory and compensation is made on the basis of the data read out from the memory, compensation for defects can be made very satisfactorily without concomitant compensation errors. However, the volume of the data is increases undesirably since the data concerning the location of the defective pixels and the level of the defective components included in the output signal need to be stored in the memory. When the location of each of the defective pixels is indicated by an absolute address, the number of bits used as the position data for each defective pixel increases for a solid state image pickup device which has an increased number of pixels to increase the high image resolution. Thus, the memory capacity is necessarily increased.

When the data concerning the position of the defective pixel and the level of the defective component output signal are stored in the memory, a defect compensation signal is formed to be added to the output signal of the solid state image pickup device should the position of the defect compensation signal be deviated with respect to the output signal of the solid state image pickup device, so-called compensation flaws occur due to the defective compensating operation and deteriorate the quality of the image pickup output signal. In addition, should it be intended to compensate for the defects in such a manner as to take the above described changes in the various defect levels into account, it is necessary to carry out an extremely complex processing operation. In the solid state image pickup apparatus having an image pickup unit constructed in accordance with the spatial pixel shifting system, it is necessary to form defect compensating signals in phase with the image pickup outputs obtained at each of the first, second and third solid state image pickup devices.

SUMMARY OF THE INVENTION

It is therefore an object of the present invention to provide a solid-state image pickup apparatus of a novel construction in which, in view of the above described various inconveniences of the prior-art solid state image pickup apparatus, the deteriorated picture quality ascribable to the image pickup output from defective pixels in solid state image pickup devices, such as CCDs, is compensated by signal processing, in such a manner as to produce image pickup output signals having a superior picture quality.

It is another object of the present invention to provide a solid-state image pickup apparatus of a novel construction in which the timing information representing the defective pixel position and the amplitude information representing the level of the defective components in the solid-state image pickup devices are separately processed by a double route processing system to form defect compensation signals, whereby the defect compensating operation may be performed positively so that the changes in the various defect levels may be taken into account.

It is a further object of the present invention to provide a solid-state image pickup apparatus of a novel construction in which both the image defect due to white flaw defect pixels having temperature dependency and the image defect due to black flaw defect pixels not having temperature dependency are compensated, in such a manner as to produce image pickup output signals having a superior picture quality.

It is a further object of the present invention to provide a solid-state image pickup apparatus of a novel construction in which, even when the mode of reading out signal charges is switched, defect compensation signals associated with the various operating modes can be formed in a simple manner to allow for positive defect compensating processing of the solid-state image pickup devices.

It is a further object of the present invention to provide a solid-state image pickup apparatus having an image pickup unit constituted by solid state image pickup devices in which the charge accumulation time in each pixel can vary, wherein even when the charge accumulation time in the solid state image pickup devices is changed, a correct defect compensating operation may be performed in such a manner as to produce image output signals having a superior picture quality.

It is a further object of the present invention to provide a solid-state image pickup apparatus of a novel construction in which the positions of defective pixels included in the solid state image pickup devices are indicated efficiently by position data formed by a smaller number of bits to simplify the construction of memory means and the peripheral circuits, allowing for an efficient compensating operation of the image defect providing image pickup output signals having a superior picture quality.

It is a further object of the present invention to provide a solid state image pickup apparatus of a novel construction in which the relative distance between the defective pixels in an encoded form is used as the position data for the defective pixels included in the solid state image pickup devices, and in which, in case of a larger relative distance between the defective pixels, a dummy defective pixel is set in such a manner as to locate the defective pixels efficiently.

It is a further object of the present invention to provide a solid state image pickup apparatus of a novel construction in which wasteful power consumption in the memory means storing the data concerning the locations of the defective pixels and the output signal levels of the defective components is eliminated to lower the power consumption of the overall apparatus without obstructing the compensating operation.

It is a further object of the present invention to provide a solid state image pickup apparatus of a novel construction in which for the defects having a defect level so low that the compensation flaw remaining after the disappearance of the small defect are not objectionable, the compensating operation is not carried out. Only the flaw defects having the high defect level are selectively compensated so as to prevent the picture quality from being deteriorated by overcompensation or under compensation.

As a result, the image pickup output signals have a superior picture quality.

It is still another object of the present invention to provide a solid state image pickup apparatus of a novel construction in which the positions for generating the defect compensation signals for the image pickup outputs obtained at the solid state image pickup devices in a spatial pixel shifting system are separately and variably set to allow for a positive defect compensating operation.

The above and other objects and novel features of the present invention will become appararent from reading the following description and the appended claims.

DESCRIPTION OF THE PREFERRED EMBODIMENT

Figure 1:
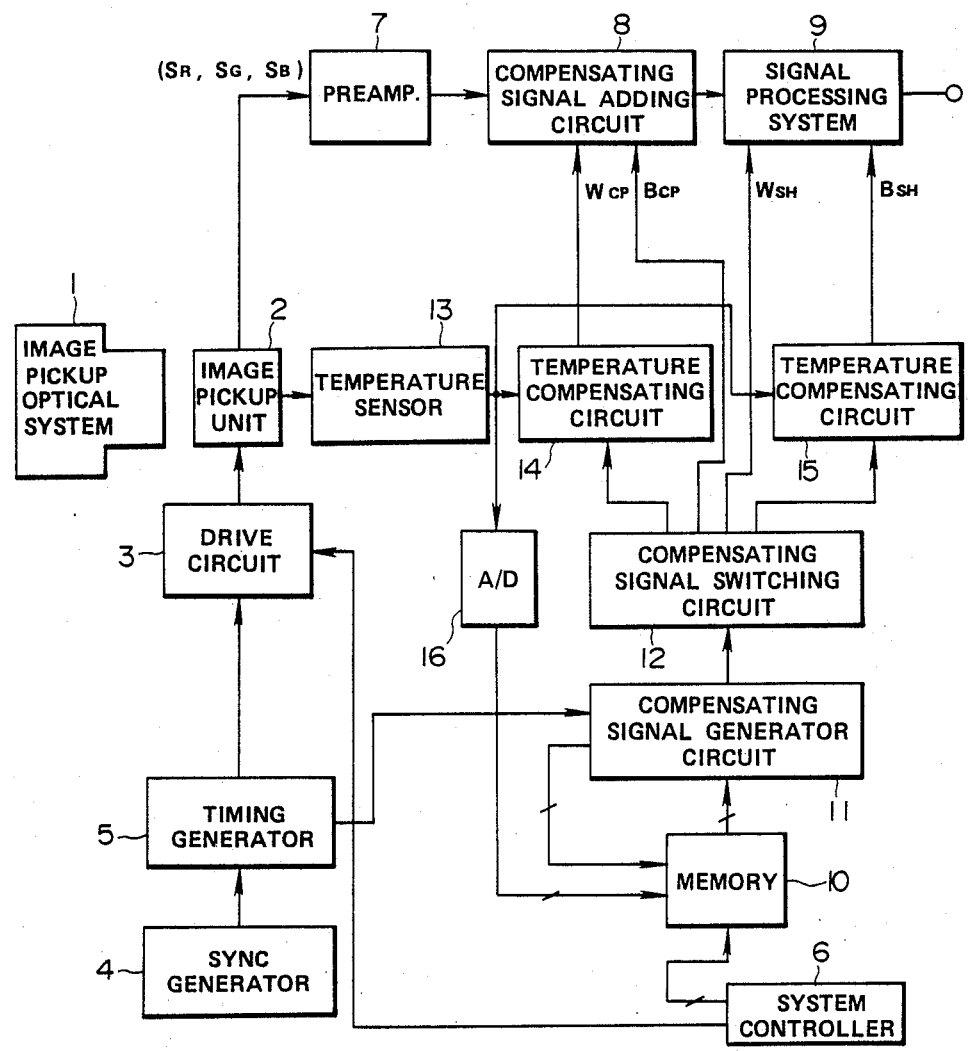
FIG. 1 is a block diagram showing the construction of an embodiment of a video camera pertaining to the present invention.

In the embodiment shown in the block diagram of FIG. 1, the present invention is applied to a color video camera in which color image pickup is achieved at a three-plate type image pickup unit 2. The image pickup unit 2 is constituted by three solid-state image sensors in the form of separate plates. Formed on the image pickup surfaces of the plates are images of a scene derived from the image pickup light color-separated by an image pickup unit 1 into the three prime colors, red (R), green (G) and blue (B).

In the present embodiment, the solid-state image sensor constituting the image pickup unit 2 is formed for example by a large number of light-receiving sections 5 each associated with one of the pixels and arranged in a matrix. Vertical transfer registers VR are provided along the vertical directions on one side of the light receiving sections S, and a horizontal transfer register HR is provided at the terminal ends of the vertical transfer register VR, as shown in FIG. 2A. Three interline transfer type CCD image sensors 2R, 2G and 2B are used. In each, signal charges corresponding to the light intensities received at each of the sections S are accumulated and transferred to associated vertical transfer registers VR for each vertical line. Transfer occurs at intervals of one-field for a one-frame period. The signal charges are transferred through the vertical transfer register VR to the horizontal transfer register HR, from which the signal charges for each horizontal line are taken as the imge pick-up output. The image pickup unit 2 is arranged and constructed in accordance with a spatial pixel shift system in such a manner that the CCD image sensor 2G adapted to pick up the scene image of the green (G) component is shifted by ½ pixel pitch (P/2) along the horizontal direction with respect to the other two CCD image sensors 2R and 2B which are adapted to pick up the scene images of the field of the red (R) and blue (B) components, respectively.

As shown in FIG. 1, a driving circuit 3 receives from a timing generator 5, a horizontal transfer pulse $\phi_H$ and a vertical transfer pulse $\phi_V$ synchronized with sync signals SYNC produced by a sync generator 4. Also transmitted to the drive circuit 3 is a read mode designating signal and a shutter control signal from a system controller 6. The designating signal designates a field read mode to read the signal charges in their entirety corresponding to the received light volume obtained at each of the light receiving sections S of the CCD image sensors 2R, 2G and 2B, during one field period. The designating signal designates a frame read mode for reading the signal charges obtained at the light receiving sections S in their entirety during one frame period. The shutter control signal controls the charge accumulation time for the CCD image sensors to control the shutter speed of a so-called electronic shutter.

In the CCD image sensors 2R, 2G and 2B, constituting the image pickup unit 2, the frame readout mode has a charge accumulation time of 1/30 second and the field read mode has a charge accumulation time of 1/60 second. Hence, the charge accumulation time of the field read mode is half that for the frame read mode. In the field read mode, the signal charges obtained at the two vertically adjoining light receiving sections S are summed together before being read so as to provide the same sensitivity as that during the frame read mode.

The color image pickup outputs $S_R$, $S_G$ and $S_B$ obtained at the image pickup unit 2 constituted by the three CCD image sensors 2R, 2G and 2B are supplied through a preamplifier 7 and a compensating signal adding circuit 8 to a signal processing system 9. The pickup outputs $S_R$, $S_G$ and $S_B$ are subjected to defect compensation in the adding circuit 8 and subjected to gamma or shading compensation in the processing system 9, then outputted after conversion into video signals conforming to the prescribed standard television system provided by the CCIR or EIA.

In the present embodiment, the CCD image sensors 2R, 2G and 2B are subjected to a defect test analyzing the location of the defective pixels and the kind as well as the level of the defects. These data are stored in a memory 10 as the compensating data. White flaw defect compensation signals $W_{CP}$, black flaw defect compensation signals $B_{CP}$, white shading compensation signals $W_{SH}$ and black shading compensation signals $B_{SH}$ are formed at the time of the output signals for the defective pixels of the CCD image sensors 2R, 2G and 2B based on the compensation data read from the memory 10 by the compensating signal generator circuit 11. These compensation signals $W_{CP}$, $B_{CP}$, $W_{SH}$ and $B_{SH}$ are supplied through a compensating signal switching circuit 12 to the compensating signal adding circuit 8 and the signal processing system 9 for compensating the image defects in the compensating signal adding circuit 8 and the signal processing system 9.

The image pickup unit 2 is provided with a temperature sensor 13 for sensing the temperatures at the CCD image sensors 2R, 2G and 2B so that the compensating signals $W_{CP}$ and $B_{SH}$ for the white flaws and the black shading will be temperature compensated at temperature compensating circuits 14 and 15 based on the output of the temperature sensor 12. The temperatures of the CCD image sensors 2R, 2G and 2B as indicated by the detection output at the temperature sensor 13, are digitized at an analog to digital (A/D) converter 16, then transmitted as address data to the memory 10.

Figure 3:
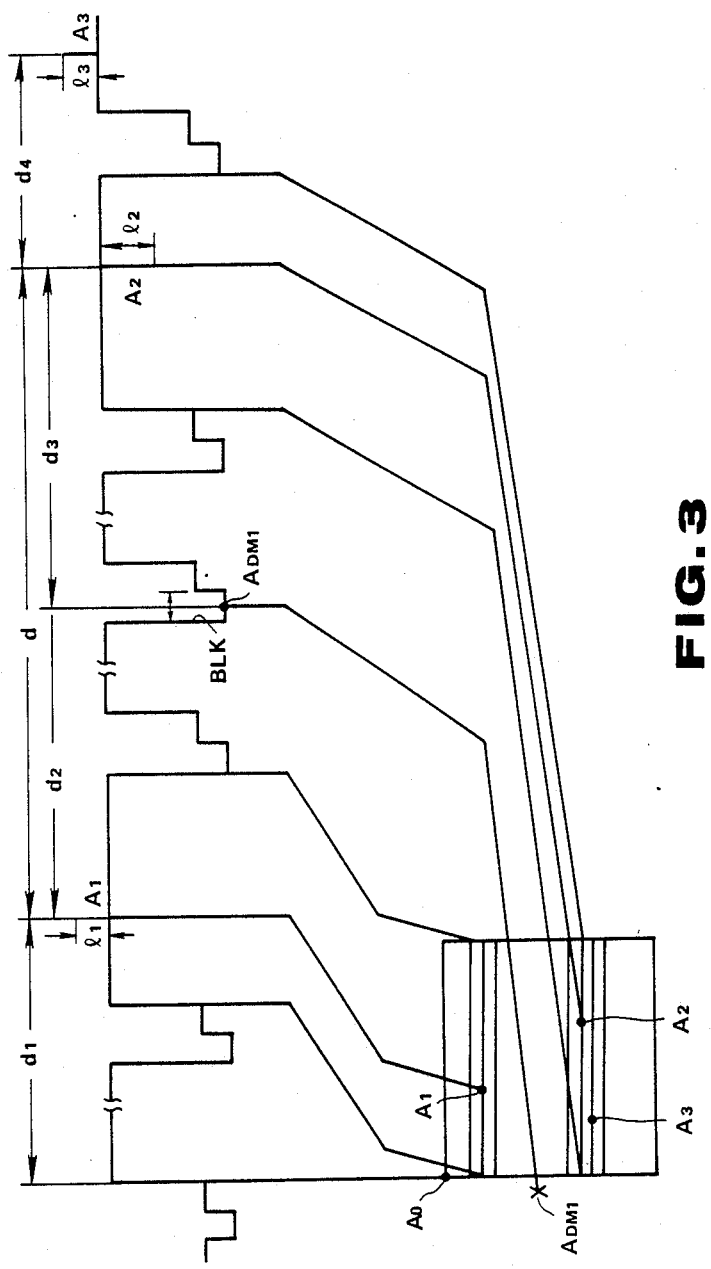
FIG. 3 is a diagrammatic view for illustrating the pixel defects and the image pickup output of the CCD image sensor shown in FIG. 2.

The defect tests for the CCD image sensors 2R, 2G and 2B a test temperature which is ambient temperature at which the image defects frequently occur. The defect tests are carried out in such a manner that (1) the locations $A_1$, $A_2$, ... of the white and black flaw defect pixels of the CCD image sensors 2R, 2G and 2B are identified, (2) the kinds and the levels $l_1$, $l_2$, ... of the defects are detected and (3) the positional data of the defective pixels are obtained. The first defect pixel position $A_1$ counting from a reference point $A_0$ is represented by the digital data of a predetermined number of bits corresponding to the distance $d_1$ from the reference point $A_0$ in the encoded form. The position An of another given defective pixel, wherein n is any arbitrary integer, is represented by the digital data of a predetermined number of bits corresponding to the distance $d_n$ from the preceding defective pixel position $A_{n-1}$. When the relative distance between any arbitrary defective pixel and the next defective pixel is so long that it cannot be represented by the digital data of the predetermined number of bits, (as in the case of a dummy pixel position $A_{DM1}$ between the position of a first defective image A1 and the position of a second defective image A2 having a relative distance d as shown for example in FIG. 3), a dummy defective pixel is set between these defective pixels. The relative distance d is divided into a distance $d_2$ from the first defective pixel position $A_1$ to the dummy defective pixel position $A_{DM1}$ and a distance $d_3$ from the dummy defective pixel position $A_{DM1}$ to the second defective pixel position $A_2$. The distances $d_2$ and $d_3$ are represented by digital data having respective predetermined numbers of bits.

It is noted that, when the positions $A_1$, $A_2$, ... of the defective pixels of the CCD image sensors 2R, 2G and 2B are represented by the two-dimensional absolute addresses, 10 data bits 10 data bits along the horizontal direction and along the vertical direction are needed for the address data. However, when the defective pixel position $A_n$, wherein n is any arbitrary integer, is represented by the encoded digital data of a predetermined number of bits corresponding to the distance $d_n$ from the directly preceding defective pixel position $A_{n-1}$, the address data can be compressed to the number of bits necessary to represent the maximum value of the relative address. For example, for the relative address data having 12 bits, data compression of 8 bits may be achieved for one defective pixel position. As an example, for a maximum relative distance of 4.5 lines represented by the 12-bit relative address data when the relative distance $d_n$ from a given defective pixel position $A_n$ to the next defective pixel position $A_{n+1}$ is not less than 4.5 lines, one or more dummy defective pixel positions $A_{DM}$ may be set between the defective pixel positions An and $A_{n+1}$, so that the relative distance $d_n$ is divided and reduced to not more than 4.5 lines. As a result, the defective pixel position $A_{n+1}$ is represented by 12 bits of the relative address data. In this manner, when the relative distance $d_n$ between a given defective pixel position $A_n$ and the next pixel position $A_{n+1}$ is so long than it cannot be represented by the digital data of the predetermined number of bits, one or more dummy defective pixels may be set between the defective pixels for dividing the relative distance $d_n$. Thus, the defective pixel positions can be represented by the digital data of the predetermined number of bits. It is noted that the image pickup output signals are not affected in quality by the dummy defective pixel positions $A_{DM1}$ by setting the dummy defective pixel positions so as to lie within the blanking period BLK of the image pickup output signals read out from the CCD image sensors 2R, 2G and 2B.

Figure 4A:
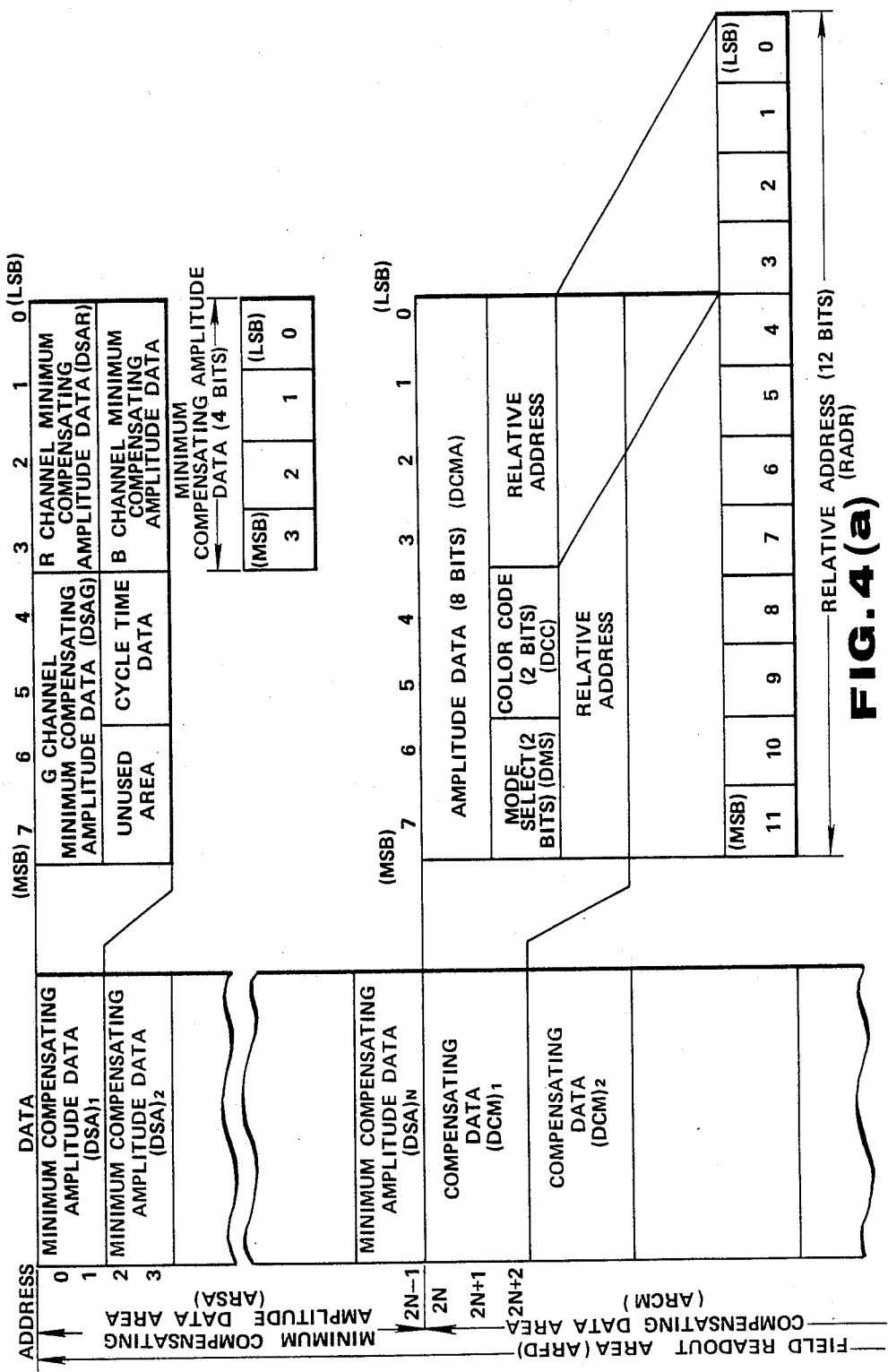
FIGS. 4(a)–4(b) show a memory map of a memory adapted for storing the data concerning the pixel defects of the CCD image sensor.
Figure 4B:
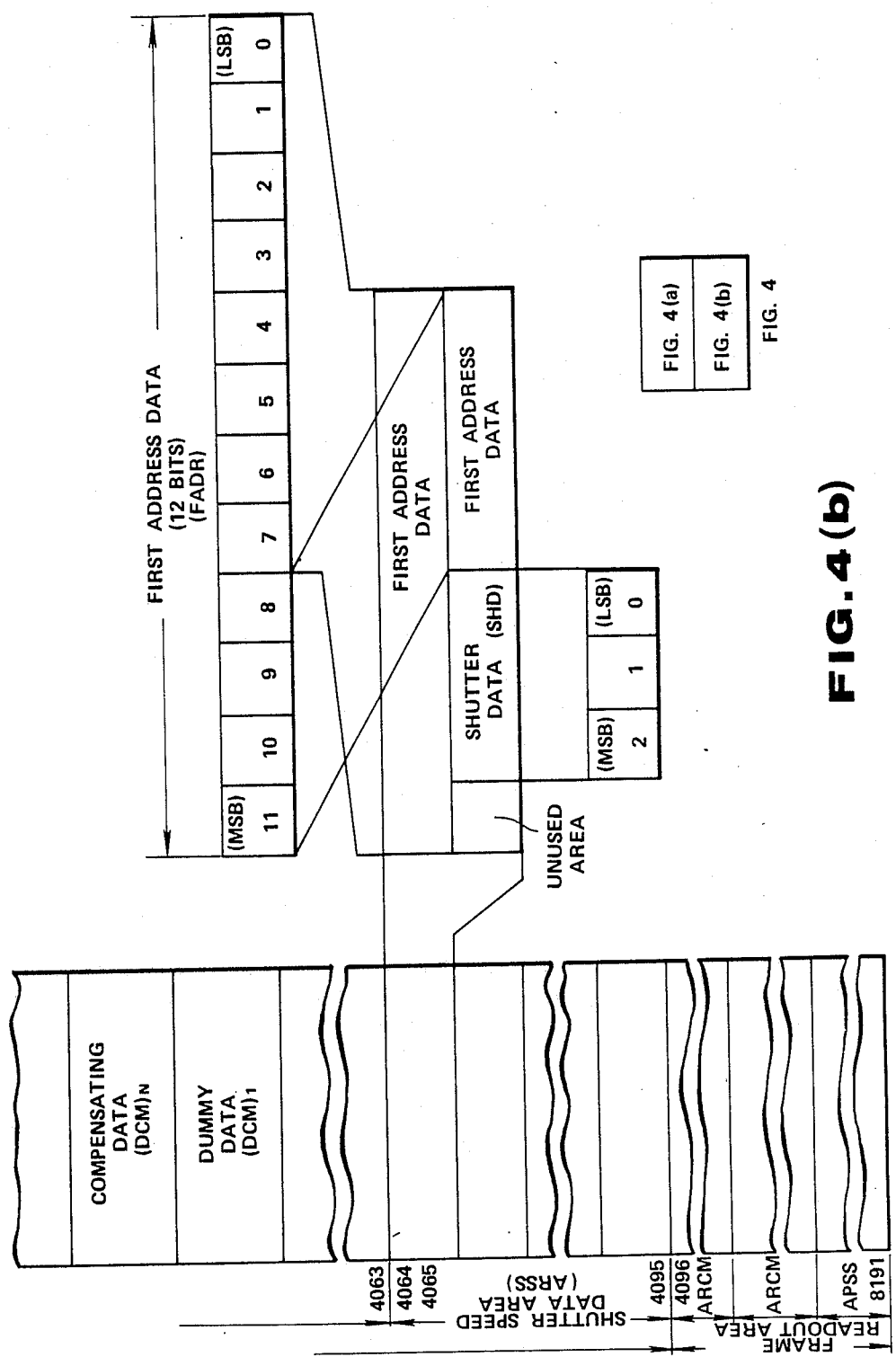

In the present embodiment, the memory 9 is divided into a field readout area ARFD from an address 0 to an address 4095 and a frame readout area ARFM from an address 4096 to an address 8191, as shown in the memory map of FIG. 4. Each of the readout areas ARFD and ARFM is divided into a minimum amplitude data area ARSA, a data area ARCM and a shutter speed data area ARSS.

In the minimum amplitude data area ARSA, there are written N number of minumum amplitude data DSA indicating the minimum amplitude of a correcting operation dependent upon the image pickup conditions, such as the temperatures and the shutter speed, with respect to the image pickup outputs of the CCD image sensors 2R, 2G and 2B. The minimum amplitude data DSA is formed by 2-byte data, of which 4 bits are allotted to each of the minimum channel amplitude data for the R, G and B channels DSAR, DSAG and DSAB, 2 bits are allotted to the cycle time data and the remaining 2 bits are unused bits.

In the data area ARCM, there are written data DCM obtained from the above described defect tests conducted on the CCD image sensors 2R, 2G and 2B. These data DCM are made up of 8-bit amplitude data DCMA associated with the defect level, 2-bit mode select data DMS indicating the kind of the defect, 2-bit color code data DCC indicating the channel to be compensated and 3-byte data formed by the 12-bit relative address data RADR indicating the distance to the next defect pixel position. These data DCM include data DCM' which relates to the dummy defective pixels.

In the shutter speed data area ARSS, there are written 15 2-byte data each composed of shutter data SHD and 12-bit first address data FADR. The shutter data SHD is for converting the 4-bit shutter speed data which indicates the present shutter speed of the electronic shutter into 3-bit data. The 12-bit first address data FADR indicates the starting address of the above data area ARCM, that is, the address 2N.

Figure 5:
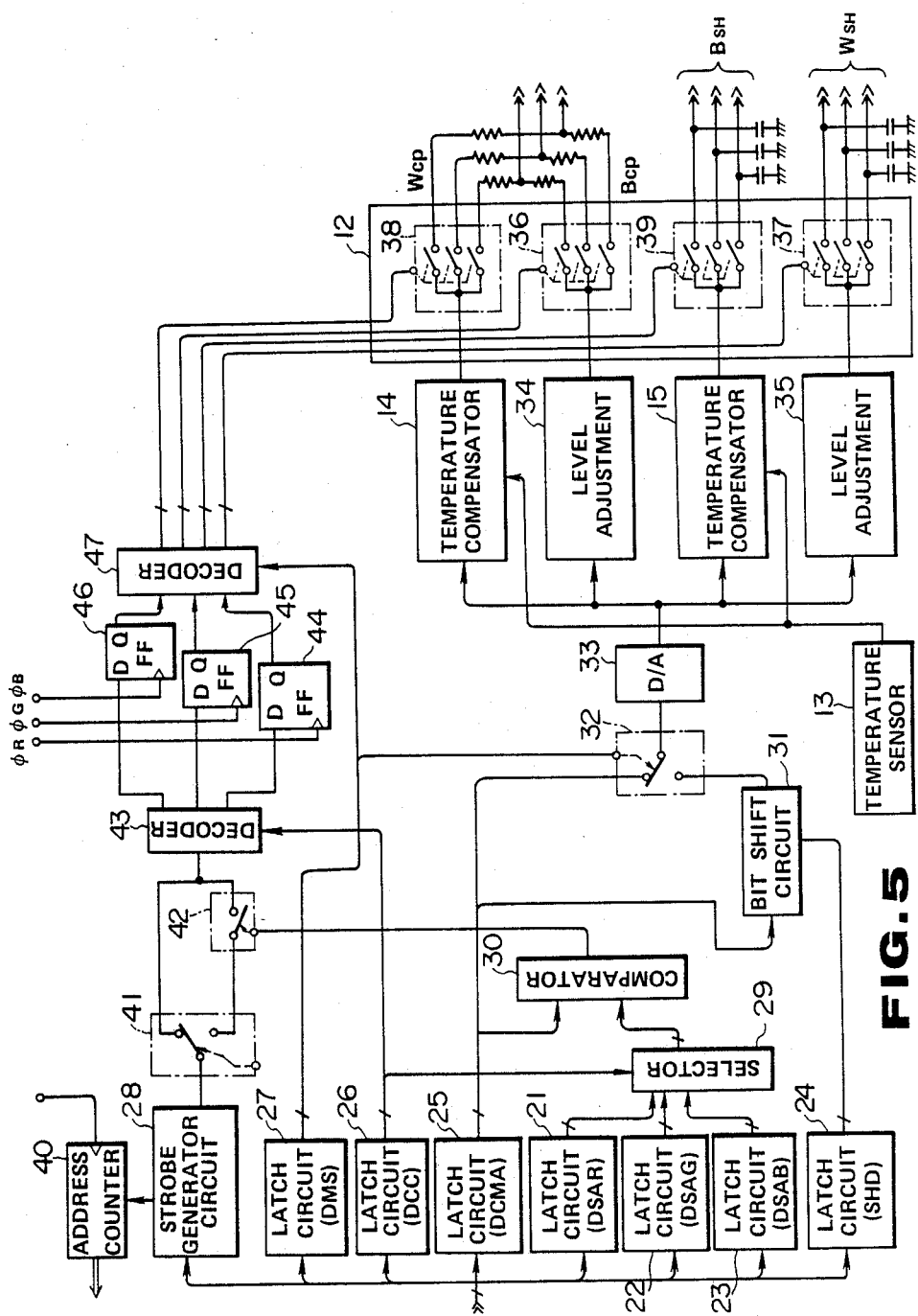
FIG. 5 is a block diagram showing a compensating signal generator circuit and peripheral circuits for reading compensating data from the memory and for forming various compensation signals.
Figure 6:
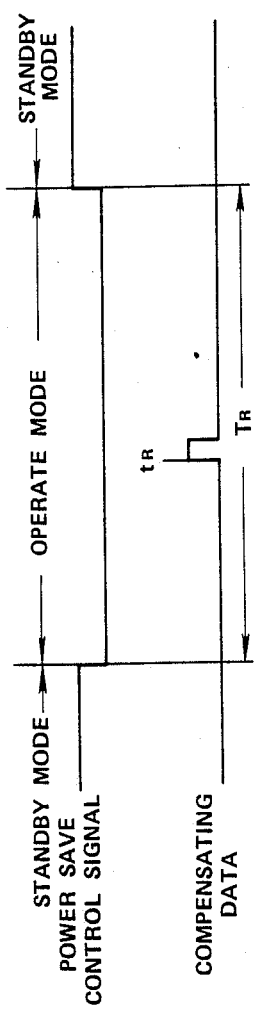
FIG. 6 shows a timing chart showing the controlling operation performed by the compensating signal generating circuit for saving the power consumption in the memory.
Figure 7:
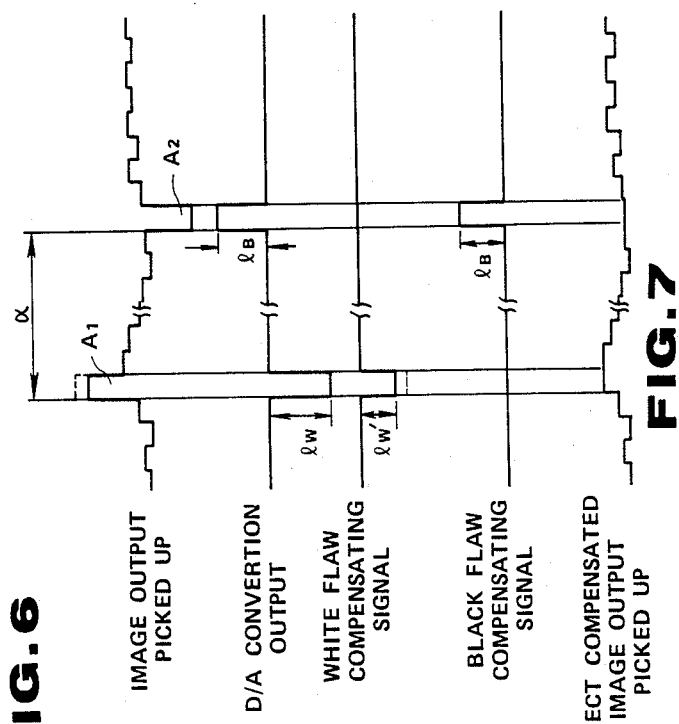
FIG. 7 shows a waveform diagram for illustrating the defect compensating operation making use of the compensating signals formed at the compensating signal generating circuit.
Figure 8:
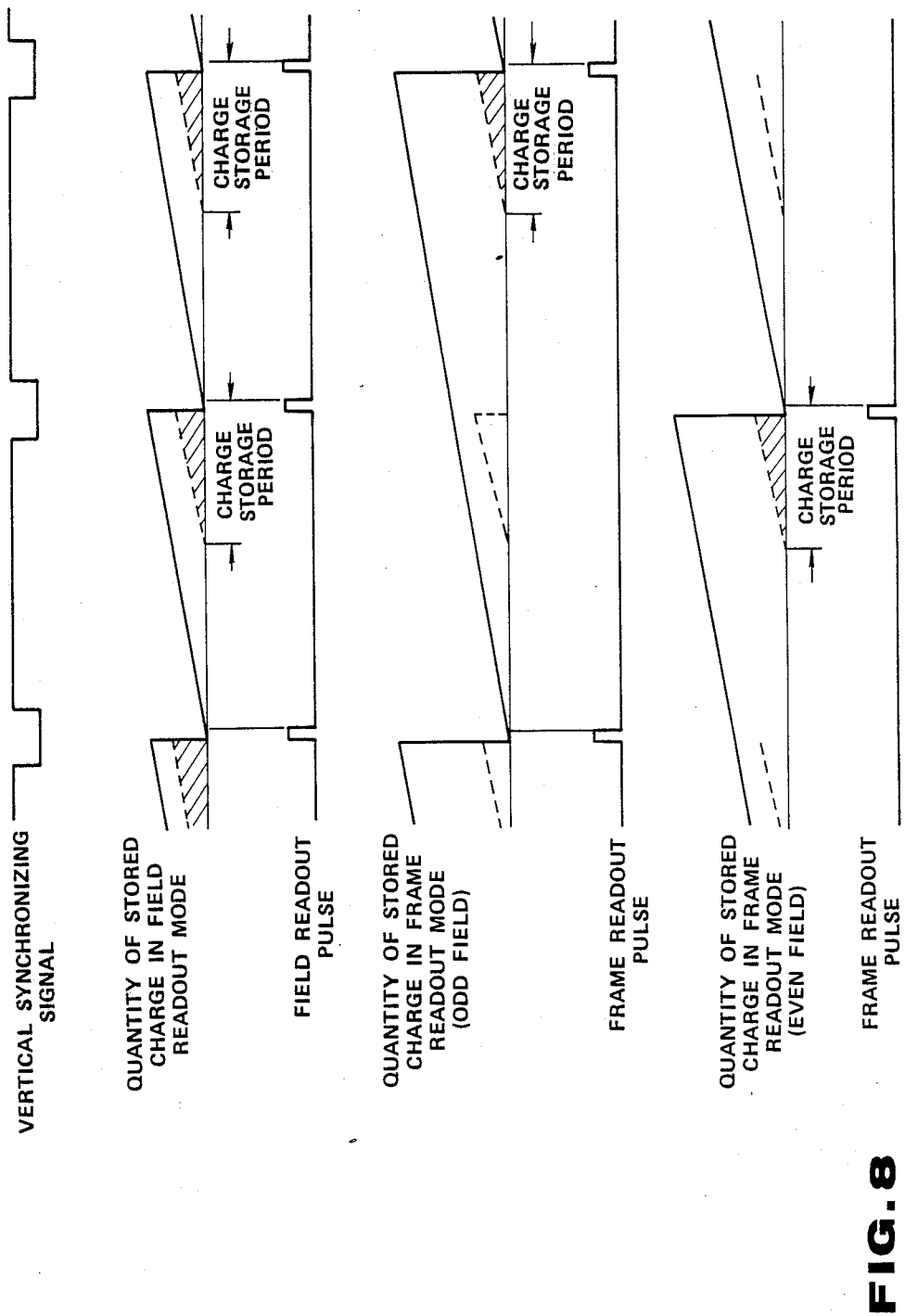
FIG. 8 shows a waveform diagram for illustrating the relation between the charge accumulation time and the accumulated charges for the field and frame readout modes of the CCD image sensor.

Referring to FIG. 5, an embodiment of the compensating signal generator circuit 11 is shown comprising seven latch circuits 21 to 27, a strobe generator circuit 28, and peripheral circuits. The latch circuits 21 to 27 receive various data from the memory 10.

When performing the image pickup operation at the operating mode preset in the system controller, the compensating signal generator circuit 11 performs an initializing operation during the blanking periods at intervals of one field or one frame. Depending on the image pick-up conditions such as the shutter speed preset in the system controller 6 or the temperature data transmitted from the temperature sensor 13 by way of the A/D converter 16, the minimum amplitude data for the R, G and B channels DSAR, DSAG and DSAB read out from the minimum amplitude data area ARSA of the memory are latched in the first to third latch circuits 21, 22 and 23 and the shutter data SHD read out from the shutter speed data area ARSS of the memory 10 are latched in the fourth latch circuit 24. The generator circuit 11 operation is also based on the first address data FADR read out from the shutter speed data area ARSS. The strobe generator circuit 28 causes an address counter 40 to read out data $DCM_1$ from the leading address in the data area ARCM of the memory 10. To do so the address 2N and the relative address data RADR indicating the distance from the point of origin $A_0$ to the first defective pixel positon $A_1$ is latched in the strobe generator circuit 28 while the amplitude data DCMA, color code data DCC and the mode select data DMS are latched in the fifth to seventh latch circuits 25 to 27.

When the strobe generator 28 terminates the above described initializing operation and proceeds to the compensating operation, the strobe generator circuit 28 outputs a strobe pulse to coincide with the timing of the output of the first defective fixel position. The relative address data RADR latched in the course of the initializing operation is used to increment the address counter 40 to read out the next data $DCM_2$ from the data area ARCM of the memory 10 and latch the relative addres data indicating the distance to the next defective pixel position $A_1$ in the strobe generator 28. In addition, the amplitude data DCMA, color code data DCC and mode select data DMS are latched at the fifth to seventh latch circuits 25 to 27. Strobe pulses are output sequentially to coincide with the timing of the respective defective pixel positions $A_n$ in the output signal.

The first to third latch circuits 21 to 23 latch the minimum amplitude data DSAR, DSAG and DSAB of the R, G and B channels read out from the minimum amplitude data area ARSA of the memory 10. These amplitude data DSAR, DSAG and DSAB are then transmitted through a selector 29 to a comparator 30.

The fourth latch circuit 24 latches the shutter data SHD read out from the shutter speed data area ARSS of the memory 10. The shutter speed data are then transmitted to a bit shift circuit 31 as control data.

The fifth to seventh latch circuits 25, 26 and 27 are adapted to latch amplitude data DCMA, color code data DCC and mode select data DMS included in the data DCM read out from the data area ARCM of the memory 10.

The amplitude data latched in the fifth latch circuit 25 are transmitted to the comparator 30, to a first switching circuit 32 and via a bit shift circuit 31 to a digital/analog (D/A) converter 33. The color code data DCC latched at the sixth latch circuit 26 is control data supplied to the selector 29 and to a first decoder 43 as later desribed. The mode select data DMS latched in the seventh circuit 27 is control data transmitted to the first switching circuit 32, to a second switching circuit 41 and to a second decoder 47 as later described.

The selector 29 selects the minimum amplitude data DSAR, DSAG and DSAB for the R, G and B channels latched in the first to third latch circuits 21 to 23 that is designated by the color code data DCC from the sixth latch circuit 26. The selected minimum amplitude data DSA then is transmitted to the comparator 30. The comparator compares the minimum amplitude data DSA selected at the selector 29 to the amplitude data DCMA latched at the fifth latch circuit 25 and transmits a comparison output signal to a third switching circuit 42 as the control data. The third switching circuit 42 is closed when the amplitude data DCMA is larger than the minimum amplitude data DSA.

Depending on the shutter data transmitted as the control data from the fourth latch circuit 24, the amplitude data DCMA transmitted from the fifth latch circuit 25 is subjected to a bit shifting operation, shown for example in Table 1, at the bit shifting circuit 31.

TABLE 1

| shutter speed | Bit Shifting Operation | | |
|---|---|---|---|
| | shutter data | number of bit shift | gain |
| 1/60 | LLL | 0 | 1 |
| 1/100 | LLH | 1 | ½ |
| 1/125 | LLH | 1 | ½ |
| 1/250 | LHL | 2 | ¼ |
| 1/500 | LHH | 3 | ⅛ |
| 1/1000 | HLL | 4 | 1/16 |
| 1/2000 | HLH | 5 | 1/32 |
| 1/4000 | HHL | 6 | 1/64 |
| 1/10000 | HHH | 7 | 1/128 |

The bit-shifted amplitude data DCMA are then transmitted by way of the first switching circuit 32 to the D/A converter 34.

The first switching circuit 32 is controlled with the mode select data DMS supplied from the seventh latch circuit 27 as the control data. The bit shift circuit 31 is selected when the mode select data DMS indicates the white flaw defect mode. The fifth latch circuit 25 is selected when the mode select data indicates some other defect mode.

The amplitude data transmitted by way of the first switching circuit 32 are converted at the D/A converter 33 into corresponding analog signals. The analog amplitude signals produced at the D/A converter 33 are supplied to first and second level adjustment circuits 34 and 35 and first and second temperature compensating circuits 14 and 15, the analog amplitude signals then are; selectively outputted by way of first to fourth signal switching circuits 36 to 39 from the circuits 34, 35, 14 and 15 as various amplitude compensating signals.

On the basis of first address data FADR read out from the shutter speed data area ARSS of the memory 10 and the relative address data included in the data DCM read out from the data area ARCM of the memory 10, the strobe generator circuit 28 generates strobe pulses to coincide with the timing for the output signals from the associated defective pixel positions $A_1$, $A_2$, ... of the CCD image sensors 2R, 2G and 2B making up the image pickup unit 2. Simultaneously, the first address data and the relative address data in the address counter 40 of the memory 10 are preset.

The second switching circuit 41 is controlled with the mode select data DMS transmitted from the seventh latch circuit 27, in such a manner as to select the third switching circuit 42 when the mode select data DMS indicates the white flaw defect mode and to select the first decoder 43 when the mode select data indicates some other defect mode. The strobe pulse of the white flaw defect mode is transmitted through the third switching circuit 42 to the first decoder 43, while the strobe pulse of some other defect mode is directly transmitted to the first decoder 43. The switch position of the third switching circuit 42 is controlled with the output of the comparator 30 in such a manner that the strobe pulse of the white flaw defect mode which is transmitted through the second switching circuit 41 is transmitted to the first decoder 43 only when the amplitude data latched at the fifth latch circuit 25 is larger than the minimum amplitude data DSA selected at the selector 29.

TABLE 2

| Color Code Data | | |
| --- | --- | --- |
| L | L | R Channel |
| L | H | G Channel |
| H | L | B Channel |
| H | H | all channels |

The first decoder 43 transmits the strobe pulse to the second decoder 47 through D-type flipflops 44, 45, 46 for one or all of the R, G and B channels as shown in Table 2. The 2-bit color code data is DCC supplied as the control data from the sixth latch circuit 26 to selectively designate one of the R, G and B channels or all of the R, G and B channels.

To the clock input terminals of the D-type flipflops 44 to 46, there are transmitted from the timing generator 5 clock pulses $\phi_R$, $\phi_G$ and $\phi_B$ matched to the phase of each of the R, G and B channels for effecting phase matching of the strobe pulses supplied from the first decoder 43. In the present embodiment in which the image pickup unit 2 is constructed in accordance with the spatial pixel shifting system, the clock pulse $\phi_G$ for the G-channel is of opposite phase to the clock pulses $\phi_R$ and $\phi_B$ for the R and B channels. As a result, the strobe pulse is matched to the phase of each of the R, G and B signals From this strobe pulse, the second decoder 47 forms selective control data in association with the modes designated as shown in Table 3 by the 2-bit mode select data DMS transmitted from the seventh latch circuit 27. The second decoder 47 transmits the selective control data to the control input terminal of each of the first to fourth switching circuits 36 to 39.

TABLE 3

| Mode Select Data | | |
| --- | --- | --- |
| L | L | white flaw defect mode |
| L | H | black flaw defect mode |
| H | L | black shading mode |
| H | H | white shading mode |

The analog amplitude signals are output from the D/A converter 33 to the first or second level adjustment circuit 34, 35 or the first or second temperature compensating circuits 14, 15, then switched by the first to fourth signal switching circuits 36 to 39. Selective control data output from the second decoder 47 determines the switch positions of the switching circuits 36 to 39 so as to pass the various compensating signals.

When the mode select data DMS is LL, indicating the white flaw defect mode, the third switching circuit 38 selectively outputs the white flaw defect compensating signal $W_{CP}$ to one of the R, G and B channels indicated at the color code data DCC. The white flaw compensating signal is made of the analog amplitude signals output from the D/A converter 33 through the first temperature compensating circuit 14. When the mode select data DMS is LH, thus indicating the black flaw defect mode, the first signal switching circuit 36 selectively outputs the black flaw defect compensating signal $B_{CP}$ to one of the R, G and B channels indicated at the color code data DCC. The black flaw defect compensating signal is made of the analog amplitude signals output from the D/A converter 33 by way of the first level adjustment circuit 34. When the mode select data DMS is HL thus indicating the black shading mode, the fourth signal switching circuit 39 selectively outputs the black shading compensating signal $B_{SH}$ to one of the R, G and B channels indicated at the color code data DCC. The black shading compensating signal is made of the analog amplitude signals output from the D/A converter 33 by way of the second temperature compensating circuit 15. When the mode select data DMS in HH thus indicating the white shading mode, the second signal switching circuit 37 selectively outputs the white shading compensating signal $W_{SH}$ to one of the R, G and B channels indicated at the color code data DCC. The white shading compensating signal made of the analog amplitude signal output from the D/A converter 33 through the second level adjustment circuit 35.

It is noted that, in the present embodiment, when the data DCM are read out from the data area ARCM of the memory 10 for forming the compensating singlas $W_{CP}$, $B_{CP}$, $W_{SH}$ and $B_{SH}$, as described hereinabove, the power supplied to the memory 10 is cut off or reduced for power saving except during the readout timing $t_R$ of the data DCM. The power also is cut off or reduced for several tens of clock periods $T_R$ before and after the read-out timing for the signal charges from each of the defective pixels of the CCD image sensors 2R, 2G and 2B. This prevents wasteful power consumption by the memory 10.

In the present embodiment, the white flaw defect compensating signal $W_{CP}$ and the black flaw defect compensating signal $B_{CP}$, are summed at the compensating signal adding circuit 8, in such a manner that the code image pickup outputs $S_R$, $S_G$ and $S_B$ of the R, G and B channels arranged in accordance with the spatial pixel shifting system are subjected to a compensating operation for the image defects due to the white and black flaw defects.

The white flaw defect compensating signal $W_{CP}$ selected by the first compensating signal switching circuit 36 is summed at the compensating signal adding circuit 8 to the image pickup output obtained at the image pickup unit 2. The white flaw defect compensating signal is derived from the amplitude $l_W$ of the analog amplitude signal supplied from the D/A converter 33 to the first temperature compensating circuit 14. The compensating circuit 14 receives the amplitude signal along with the detection output of the temperature sensor 13 which represents the temperature of each of the CCD image sensor 2R, 2G and 2B of the image pickup unit 2. The amplitude is set to a new amplitude $l_W'$ for optimum adjustment of the white flaw defect at the working temperature under the actual image pickup state, in such a manner as to perform an optimum adjustment of the white flaw defect showing the temperature dependency. The white flaw defect compensating signal then is output from the temperature compensator 14 and passed through the switching circuit 36.

It is noted that the defect level of the white flaw defect that is temperature dependent is extremely small at the ambient temperature and may be safely disregarded. The defect level, however, increases exponentially with increases in temperature. Therefore, should there be a compensation error in the first temperature compensating circuit 14 which performs temperature compensation of the white flaw defect compensating signal $W_{CP}$, the white flaw defect is overcompensated or undercompensated by the white flaw defect compensation signal $W_{CP}$. As a result the so-called compensation flaw is left over in the image pickup output obtained after defect compensation. In the present embodiment, the minimum amplitude data DSA read out from the minimum amplitude data area ARSA of the memory 10 are latched in first to third latch circuits 21 to 23 of the compensating signal generator circuit 11 in the course of the initializing operation with the data such as the shutter speed or the operating temperature as the address data. Compensation is not performed for a white flaw defect having a low defect level in which the amplitude data DCMA read out from the data area ARCM of the memory 10 in the course of the actual image pickup operation is less then the minimum amplitude data DSA. Only the white flaw defect having a higher defect level is selectively compensated, thus providing a more effective white flaw defect compensating operation.

When the CCD image sensors 2R, 2G and 2B making up the image pickup unit 2 perform an electronic shutter function in which the charge accumulation times are controlled, the signal level of the white flaw defect signal contained in the image pickup output is changed in dependence upon the charge accumulation time, that is, the shutter speed. In the present embodiment, the amplitude data DCMA are subjected to the above described bit shifting shown in Table 1 by the bit shift circuit 31 in the course of the image pickup operation on the basis of the shutter data latched in the fourth latch circuit 24 of the compensating signal generator circuit 11 during the initializing operation. The shutter speed thus is associated with the gain of the white flaw defect compensating signal $W_{CP}$ to provide for an optimum white flaw defect compensating operation at all times. For associating the preset shutter speed with the gain of the white flaw compensating signal $W_{CP}$, it is possible to provide, instead of the bit shift circuit 31, a multiplication unit adapted for performing a digital or analog multiplication of the white flaw defect compensating signal $W_{CP}$ and the shutter speed or the charge accumulation time.

Figure 2B:
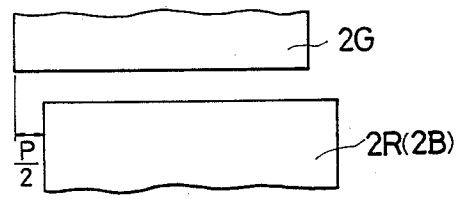
FIGS. 2A and 2B are diagrammatic views showing the construction of a CCD image sensor constituting the image pickup unit of the video camera shown in FIG. 1.
Figure 2A:
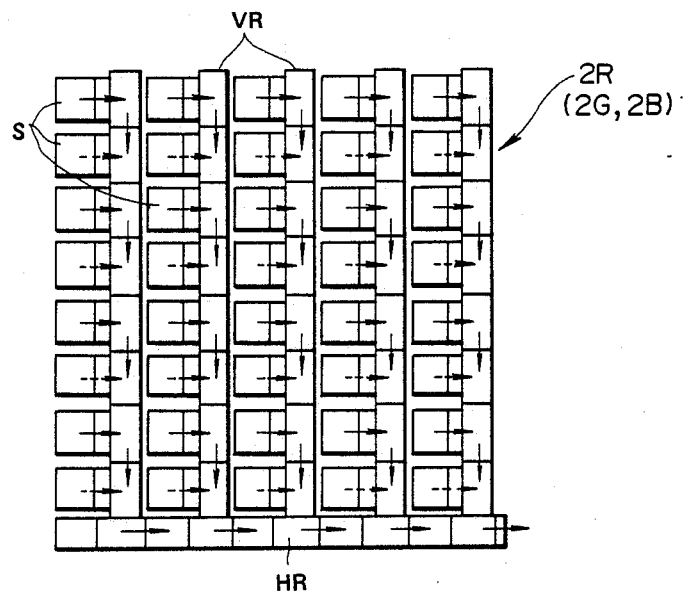

In addition, in cases where the CCD image sensors 2R, 2G and 2B of the image pickup unit 2 perform the electronic shutter operation and should the charge accumulation time for the field readout mode is reduced to one half as shown for example in FIG. 2, the produced signal charges are also reduced to one half of those for the normal mode. However, under the same circumstances for the frame readout mode, the effective charge accumulation time is reduced to one fourth that for the normal mode. Thus the signal level of the white flaw defect signal contained in the image pickup output will differ even when the shutter speed is preset to the same value, since the effective charge accumulation time will differ depending on the selected signal charge readout mode. In the present embodiment, the field readout area ARFD and the frame readout area ARFM are provided in the memory 10 where the minimum amplitude data DSA, data DCM or the shutter data SHD for these readout modes are written previously. Data are read out from either the field readout area ARFD or the frame readout area ARFM corresponding to the actually selected readout modes to perform the above described initializing operation and compensating operation and provide for optimum defect compensation from any of the readout modes.

Also, in the present embodiment, the image pickup output, compensated for image defects due to white and black flaw defects as described hereinabove, is subjected to shading compensation using black shading compensating signals $B_{SH}$ and white shading compensating signals $W_{SH}$ obtained by selectively switching as a function of the defect modes the switch positions of the second and fourth switching circuits 36 and 38 of the signal switching circuit system 12, under control of the signal processing system 9.

To provide black shading, the amplitude of the analog amplitude signal output from the D/A converter 33 is subjected to temperature compensation by the second temperature compensating circuit 15 to which the sensed output of the temperature sensor 13 is supplied. As a result, black shading can be compensated to a minimum value at the operating temperature under the actual image pickup operating conditions with the aid of the black shading compensating signal $B_{SH}$ selected at the fourth signal switching circuit 39.

Hence, in the present embodiment, the amplitude data included in the compensation data DCM read out from the memory 10 are selectively subjected to the above described bit shifting operations. The analog amplitude signals are obtained by converting the amplitude data DCMA into the analog form then selectively subjecting the signals to a temperature compensating operation. Using the control data obtained by decoding the strobe pulse, analog amplitude signals are switched by the signal switching circuit 2. In this manner, defect compensation signals are matched in phase to the image pickup outputs of the CCD image sensors 2R, 2G and 2B and used to provide optimum compensation of image defects due to white or black flaw defects to provide image pickup output signals having an extremely high picture quality.

What is claimed is:

1. A solid state television camera with a noise cancelling circuit comprising:
   solid state semiconductor image sensor means for providing an output signal corresponding to a sensed image, said image sensor means including picture elements arranged in a raster, said sensor means having crystal defects at a plurality of said picture elements causing noise in said output signal at times corresponding to the sampling of the output of said picture elements,
   memory means for storing position data indicating the positions of picture elements having said crystal defects and for storing defect level data indicating the level of a compensating signal for compensating the output signal associated with each of said positions, said defect level data being measured at a higher temperature condition than a normal operating temperature condition,
   read out means for reading out said position data and said defect level data from said memory means,
   temperature sensing means for sensing the temperature around said solid state semiconductor image sensor means, compensating signal generating means for receiving said position data and defect level data and for generating compensating signals to coincide with the timing of the output signal corresponding with said plurality of picture elements having crystal defects, the compensating signal having the level which is temperature compensated by the defect level data for the temperature output from said temperature sensing means, and control means responsive to said compensating signal for cancelling said noises from said output signal of the image sensor means.

2. The solid state television camera according to claim 1; wherein said compensating signal generating means includes a two-series signal processing system for separately processing the times in the output signal corresponding to said picture elements having crystal defects and the amplitudes in output signal for picture elements having crystal defects, said amplitudes being in analog form and being sampled in accordance with the times in the output signal corresponding to the outputs of said picture elements having crystal defects for generating defect compensating signals.

3. The solid state television camera according to claim 1;
wherein said memory means has stored therein mode codes indicating the locations of white and black flaw defect picture elements, the levels of the white and black flaw defect components contained in the output signals thereof, and the kinds of flaws in said plurality of picture elements; and further comprising means for discerning said mode codes of said picture elements based on data read from said memory means, the mode codes corresponding to said compensating signals, said compensating signal generating means forming said compensating signals as a function of the mode codes of said picture elements having crystal defects, said compensating signals being selectively temperature-compensated by the output of said temperature sensing means.

4. The solid state television camera according to claim 1; in which
said image sensor means are adapted for variably setting a charge accumulation time in each picture element, and said compensating signal generating means is adapted to form said compensating signals in association with preset charge accumulating times on the basis of data read out from said memory means, said output signals from said solid state image sensor means being compensated for crystal defects in picture elements by said compensating signals, the signal level of which is controlled based on the charge accumulation time in each picture element of said solid state image sensor means.

5. The solid state television camera according to claim 1; in which
said solid state image sensor means has a signal charge readout mode which can be switched between a first readout mode for reading out the signal charges of the totality of the picture elements in the course of approximately one field period and a second readout mode for reading out the signal charges of the totality of the picture elements in the course of approximately one frame period, the output in said first and second readout modes of said plurality of picture elements which have crystal defects being previously stored in said memory means as defective picture element data, said read out means selectively reading from said memory means said defective picture element data associated with the readout mode of signal charges from said solid state image sensor means.

6. The solid state television camera according to claim 1; wherein the distance between a defect position $A_n$ other than the first defect position $A_o$ counting from a reference point, where n stands for any arbitrary integer, and a defect position $A_{n-1}$ directly preceding said defect position $A_n$ is encoded and stored in said memory means as the position data of picture elements having crystal defects; and wherein, in case of a large distance between said defect position $A_n$ and an adjacent picture position, a dummy defective picture element is used between said defect positions and corresponding data are stored in said memory means.

7. The solid state television camera according to claim 1; wherein said read out means causes said memory means to operate only for a predetermined period including the time during which data necessary for forming said compensating signals at said compensating signal generating means are read out from said memory means, with some time allowance before and after said time duration, said memory means being controlled to remain inoperative during other periods.

8. The solid state television camera according to claim 1; further comprising
comparator means for comparing the signal level of the compensating signal generated from said compensating signal generating means with a reference signal level that changes with the image pickup conditions, said compensating signals having a signal level larger than the reference signal level being taken out as determined by the output of said comparator means.

9. The solid state television camera according to claim 1; in which said image sensor means includes first, second and third solid state image pickup elements, said first solid state pickup element being displaced by one half picture element pitch in the horizontal direction with respect to said second and third solid state image pickup elements, said memory means storing data relating to the positions of the picture elements in said first, second and third solid state image pickup elements having crystal defects and storing data relating to the levels in the output signals at the times corresponding to the outputs of the picture elements having crystal defects, and said compensating signal generating means being operative to separately form compensating signals of said first, second and third solid state image sensor elements on the basis of data read out of said memory means, and to separately adjust the locations of generation of said compensating signals, said compensating signal generating means generating said compensating signals for said solid state image sensor devices at times corresponding to the sampling of the output of said crystal elements having crystal defects in said first, second and third solid state image sensor devices and adding the compensating signals to the output signals of said first, second and third solid state image sensor devices for compensating the crystal defects.

* * * * *